United States Patent [19]
Jennings et al.

[11] Patent Number: 5,985,188
[45] Date of Patent: Nov. 16, 1999

[54] METHOD FOR MANUFACTURING A CHAIR HAVING SEPARATE MOLDABLE PARTS

[75] Inventors: Roy E. Jennings, Temple, Tex.; John W. Shiffler, Chardon, Ohio

[73] Assignee: Aero Components, Inc., Chardon, Ohio

[21] Appl. No.: 09/094,208

[22] Filed: Jun. 9, 1998

[51] Int. Cl.[6] .................................................. B29C 44/06
[52] U.S. Cl. ..................... 264/40.1; 264/45.5; 264/54; 264/328.8; 264/500
[58] Field of Search .......................... 264/45.5, 54, 45.1, 264/500, 328.8, 40.1

[56] References Cited

U.S. PATENT DOCUMENTS

| | | |
|---|---|---|
| 3,628,832 | 12/1971 | Jennings . |
| 3,989,212 | 11/1976 | Jennings . |
| 4,002,369 | 1/1977 | Jennings . |
| 4,208,368 | 6/1980 | Egli ........................................ 264/45.5 |
| 4,952,365 | 8/1990 | Shibuya et al. ......................... 264/45.5 |
| 5,238,622 | 8/1993 | Grimmer ................................ 264/45.5 |
| 5,417,898 | 5/1995 | Volpi et al. ............................... 264/55 |
| 5,662,841 | 9/1997 | Guergov . |
| 5,798,063 | 8/1998 | Bender et al. .......................... 264/45.5 |

FOREIGN PATENT DOCUMENTS

| | | | |
|---|---|---|---|
| 60-8022 | 1/1985 | Japan ..................................... | 264/500 |

OTHER PUBLICATIONS

"Manufacturing, A Missing Link Is Found In Closed Loop Control", Injection Molding, Jun. 1997, pp. 81–84.

"Novel Injection Control Closes Loop Between Mold Cavity And Nozzle", Modern Plastics, Jun. 1997, pp. 32–33.

"NPE 1997 Highlights", Injection Molding, Aug. 1997, pp. 26–27.

"Injection Molding", Plastics World, Aug. 1997, pp. 14, 16, 24.

"Technology Newsfocus", Plastics Technology, Aug. 1997, p. 9.

*Primary Examiner*—Allan R. Kuhns
*Attorney, Agent, or Firm*—Brooks & Kushman P.C.

[57] ABSTRACT

A method and mold design for forming a molded chair seat portion and chair back support portion using air counter-pressure and two different materials in an injection molding procedure. The two different materials comprise a first material having a low flexural modulus and the other material having a high flexural modulus. Other additives for tailoring the physical properties of the molded product are added to the mixture of the two materials. The air counter-pressure is achieved using shop air pressure. The mold may be used to form the seat portion and the back support portion with a single stroke. An endothermic foaming agent is added to the mixture of the two materials to reduce the weight of the finished part, to reduce cycle time, and to assist in the uniform distribution of the materials that are injected into the mold cavity by the injection nozzle.

5 Claims, 7 Drawing Sheets

METHOD FOR MANUFACTURING A CHAIR HAVING SEPARATE MOLDABLE PARTS

TECHNICAL FIELD

The invention relates to injection molding processes using a gas counterpressure molding technique.

BACKGROUND OF THE INVENTION

It is known practice to manufacture molded parts using a gas counterpressure technique with an injection molding machine. An example of an injection molding method using gas counterpressure may be seen by referring to U.S. Pat. No. 5,662,841 issued to Milko G. Guergov. The Guergov method includes introducing molten plastic melt into a mold cavity against the force of pressurized gas in the mold cavity that counterbalances the internal pressure of the melt as it is injected into the cavity. This establishes a pressure balance for the plastic, the gas pressure being controlled within the cavity at a substantially constant value during the injection of the plastic into the cavity. A closed loop control uses pressure inputs from an internal melt pressure transducer so that the rate of feed of the plastic can be controlled by a hydraulic control system to reduce warp, to avoid external marks on the surface of the finished product, and to reduce cycle time.

The mold of Guergov is pressurized prior to injection. A logic controller for controlling the hydraulic system for a plastic melt feed nozzle maintains a constant pressure differential between the gas pressure in the cavity and the melt pressure throughout the injection process. As the melt solidifies in the mold, pressure adjustments are made using a closed loop control strategy. Each region of the molding solidifies with equal pressure. This balanced flow of the melt produces a finished part with reduced internal stress. The controller develops a closed loop PID signal in response to input information from an internal pressure transducer. The hydraulic unit uses the closed loop control signal to effect adjustments of the injection pressure, thereby maintaining continuous control over the internal melt pressure.

BRIEF DESCRIPTION OF THE INVENTION

It is an objective of the invention to develop a gas counterpressure molding technique that is capable of manufacturing a family of separate parts during each stroke of the molding machine. The moldable parts are a chair seat portion and a back support portion of a chair. It is contemplated that the invention may be used in the manufacture of institutional chairs, such as chairs for school desks in which the seat portion and the back support portion are mounted on a tubular steel frame. The frame and the back support portion are configured so that the chairs can be readily ganged and easily stacked. A further objective is to reduce the weight of the finished chair.

It is another objective to provide a method for manufacturing institutional chairs that are resistant to cracking, scratching, ultraviolet deterioration and surface imperfections and are of reduced material cost.

The mold material that is used during the molding process comprises two different constituents that are molded with a single stroke using a high tonnage, single-stroke, injection molding machine. One of the materials has a low flexural modulus and the other has a high flexural modulus. The two are separated in the mold cavities during the molding process by reason of the different characteristics of the two moduli. The low flexural modulus material, during the molding process, moves to the outside or the skin of the part and the higher flexural modulus material stays near the center or the core of the part. Other additives such as color additives, anti-static additives and ultraviolet compensation ingredients are included in an admixture of the different materials so that they migrate to the surface of the part during the molding cycle.

One of the objectives of the invention is to use common shop air to establish the gas counterpressure in the mold. The use of nitrogen gas to establish a counterpressure during the injection phase of the molding process is not required.

The molding process of the invention is capable of forming a family of molded parts (i.e., the seat portion of a air and the back support portion) during each stroke of the injection molding machine.

The materials are separated during the molding process to establish a controlled thickness of the skin material as a percentage of the overall thickness of the part. Approximately 35% of the low modulus material will form the outer portion of the part, thereby ensuring improved surface appearance of the skin. The remaining portion of the admixture at the core of the part is foamed with an endothermic foaming agent to define a light-weight, homogeneous, cellular core structure.

The mold force is approximately 650 tons, unlike known molding machines using gas counterpressure techniques which have a molding force of approximately 75% of that amount.

The parts that are made using the improved method of the invention produce less warp, reduced internal stress, and fewer imperfections in the surface appearance such as color swirl, heat splay and heat sinks.

The material at the core of the part may be a reground plastic material or some other inexpensive wide-specification material. This reduces the material cost.

The inner core material may be a common ABS material which includes an acrylic or hardening agent, butadiene, which is a rubber material, and a styrene carrier. The endothermic foaming agent may include nucleating ingredients that decompose at process temperatures to create carbon dioxide. The carbon dioxide creates microcellular structures, which contribute to smooth skin formation around a fine cellular core.

The foaming agent significantly reduces the weight of the finished product and ensures uniform cell formation. It also reduces the cycle time because of improved melt flow characteristics that are made possible by its use. Carbon dioxide developed by the foaming agent has the secondary advantage of providing lubrication for the improved melt flow throughout the extent of the mold cavity.

PARTICULAR DESCRIPTION OF THE INVENTION

Figure 1:
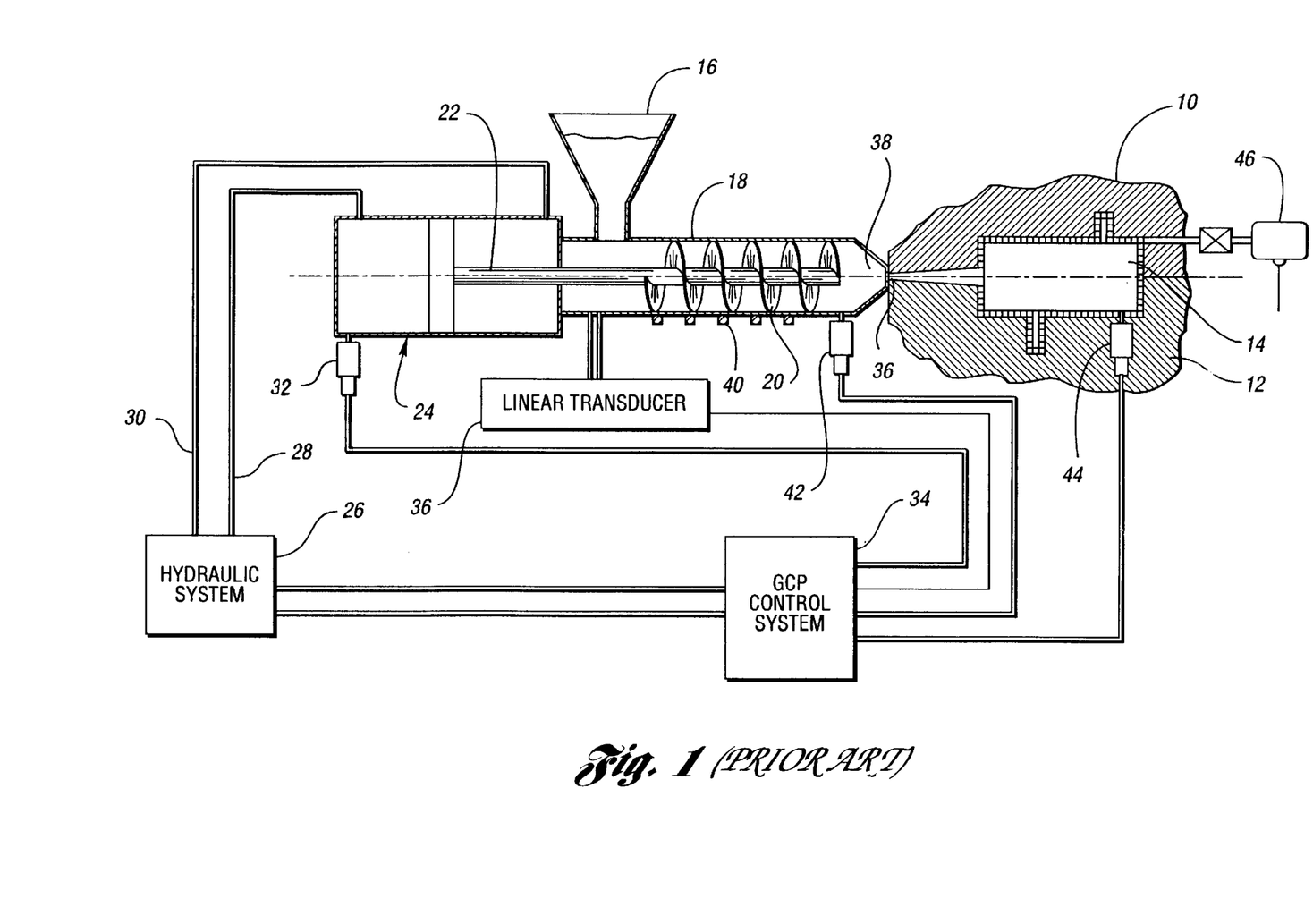
FIG. 1 is a schematic representation of a gas counterpressure molding apparatus.

For the purpose of describing a known injection molding apparatus, reference first will be made to FIG. 1 which shows an overall schematic representation of the molding apparatus that is capable of embodying the improvements of the invention. Numeral 10 represents an upper mold section and the companion lower mold section is shown at 12. The mold sections are provided with mold cavities, which together define a cavity 14, which forms the finished parts. A mixture of acrylic/butadiene/styrene (ABS) material, polycarbonate material, regrind, foaming agent, and additives such as color pellets, ultraviolet stabilizer material and antistatic material is entered into the system through a hopper shown at 16. The materials are fully mixed and homogeneous. It is dried before entry into the hopper.

The hopper feeds a barrel 18 through which an auger 20 extends. The auger is driven by a driveshaft schematically shown at 22 which, in turn, is drivably coupled to a hydrostatic motor 24. A hydraulic system 26, which includes a hydrostatic pump and motor, creates a pressure differential across the hydrostatic motor. Separate hydraulic pressure lines 28 and 30 extend from the hydraulic system to each side of the hydrostatic motor.

A pressure transducer 32 continuously monitors the pressure differential across the hydraulic system 26. The rotary speed of the auger is directly related to the pressure differential created by the hydraulic system 24. Thus, the pressure transducer 32 provides an auger speed signal for a gas counterpressure control system 34.

A linear transducer 36 monitors the position of a charge of material as it is delivered from the hooper to the auger inlet. At the discharge side 38 of the auger on the inlet side of the injection nozzle 36, the material is in the form of a melt. The material is heated by multiple heaters 40 situated along the axis of the auger. The pressure of the melt at location 38 is monitored by nozzle melt pressure transducer 42.

The cavity pressure in the mold is monitored by transducer 44.

The pneumatic system schematically shown at 46 supplies pressurized gas to the interior of the cavity 14.

In the molding method of the present invention, as previously indicated, the material involves introducing at the hopper 16 a high density ABS material as well as low density polymer material, the latter forming the outer surface portions of the finished part. When the material mixture is introduced in liquid form at the nozzle 36, the physical interaction of the high density material and the low density material will cause the low density material to migrate toward the outside of the mold cavity. A foaming agent introduced in pellet form at the hopper 16 will ensure that sufficient material has been introduced to the mold cavity through the nozzle 36. It also ensures that the cavity will be fully filled when it reaches the critical temperature at which the pellets generate a foaming gas. The foaming agent is distributed homogeneously throughout the mold cavity, which results in a significant reduction of the weight of the finished part.

As the low density material separates from the high density material as explained above, the low density material will quickly solidify when it reaches the inner walls of the mold. At that instant, the lower temperature of the mold will cause the low density material to solidify and form a skin at the mold surface. The foaming agent, when it reaches the critical temperature, then creates gas cells that exert a very high internal pressure on the skin of the part directly adjacent the walls of the mold cavity. This pressure, which originates in the interior of the molded part, exerts sufficient force to prevent formation of surface imperfections and surface sink areas.

The color additives that are added to the mix that produces the melt migrate to the surface of the part together with the low density polymer component of the melt. In this way, a smooth, mirror-like, glossy finish on both sides of the finished part is created. The glossy finish is free of swirl marks, sinks, color lines, and other surface imperfections.

The low density material may have a flexural modulus of approximately 280,000 pounds per square inch. In contrast, the high density flexural modulus of the material at the core of the part may be 340,000 pounds per square inch. The difference in the flexural moduli is sufficient to ensure physical separation of the low density material from the high density material.

In a typical chair seat or chair back support, the center of the part may be a very fine cellular core comprising 75% of ABS material, the remaining 25% being a solid resin to which the color additives are added. The skin that is formed is the low density resin, which is a polycarbonate or acrylic, typically is about 0.030 inches thick.

At the latter stages of the molding cycle, the molding dies are cooled, thereby solidifying both the skin and the core. A bonding occurs to make one integral resin part that is free of shrink sinks, surface swirls, splay from heat, and moisture marks. By using shop air as the gas counterpressure in the molding procedure, sufficient time is available to accurately monitor the temperatures and pressure every 2 milliseconds.

During the molding cycle, instantaneous control of the melt can be achieved by the hydraulic system that determines the rate of feed of the melt through the nozzle. The internal melt pressure thus is a function of the flow rate, the melt temperature, the modulus of each of the ingredients, the shrink factors, the part configuration, and other variables.

The static pressure that is developed by the pneumatic system 46 counterbalances the internal melt pressure during filling of the mold cavity and during the final solidification of the ingredients as the mold is cooled. The internal melt pressure that is targeted by the controller compensates for flow restrictions within the mold as well as viscosity changes and shop air pressure resistance at the leading edge of the melt as the melt traverses the mold cavity.

The materials are not soluble, one with respect to the other, except perhaps to a minor degree. The material with the highest modulus will begin to solidify faster than the other. This characteristic helps to separate the low modulus material while it still is in liquid form. The core material, which is the high modulus material, then will be centered in the cavity and in the finished part.

Figure 2:
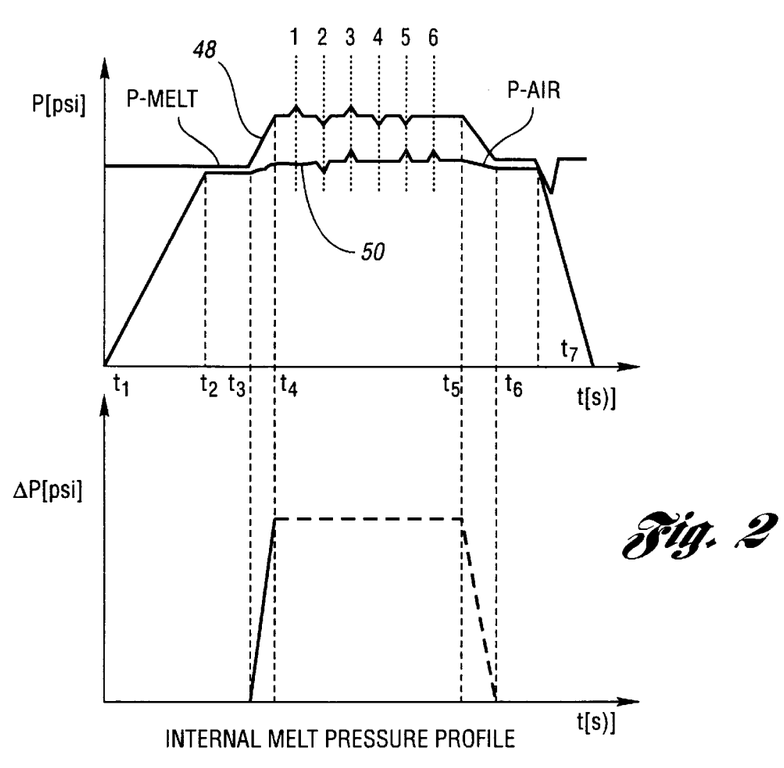
FIG. 2 is a pressure development chart showing internal pressure in the mold as well as the differential pressure in the mold as a function of mold cycle time.

FIG. 2 shows a plot of the pressure of the melt versus time. The melt pressure at the nozzle is represented by line 48 and the air pressure is represented by line 50. At the beginning of the molding cycle at time $t_1$, the air pressure is zero and the melt pressure is high (e.g., about 250 psi). At time $t_2$, the air pressure approximately equals the melt pressure. At time $t_3$, the melt begins its entry through the nozzle into the mold cavity. The melt pressure is increased until the molding pressure at time $t_4$ is reached. Thereafter, during the molding cycle, the melt pressure remains constant as it flows through the mold cavity against the force of the air pressure indicated at 50. The filling continues until time $t_5$ at which instant the mold cavity is substantially filled. The melt pressure then is decreased until it substantially matches the air pressure until the cycle is completed at time $t_7$.

The lower portion of the chart of FIG. 2 shows the internal melt pressure profile during the molding cycle. The cycle is completed at time $t_6$. Between times $t_4$ and $t_5$, the internal melt pressure remains relatively constant.

Figure 3:
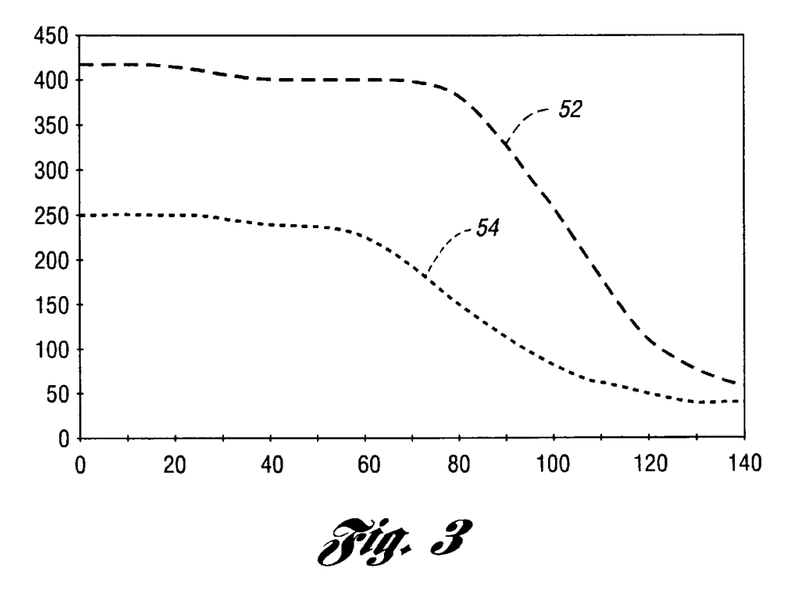
FIG. 3 is a plot of the modulus for various polymer materials used during a molding process versus temperature.

FIG. 3 shows a plot of the flexural modulus for each of two polymers. The high modulus polymer, which resides at the core of the finished part, is represented by line 52 and the low modulus polymer, which migrates to the skin of the finished part, is shown at 54. The modulus for each of the polymers remains relatively constant at molding pressures below 80° C. At elevated temperatures, up to a maximum of about 140° C., the modulus for each of the polymers decreases as indicated.

The pressure of the melt is controlled by controlling the Hydraulic pressure maintained by hydraulic system 26. When the pressure is increased, the speed of the auger increases, thereby increasing the pressure at the nozzle 36. The coloring additives that are introduced into the melt are separated along with the low modulus polymer since they have a density that is lower than the density of the high modulus polymer. The separation occurs while both the high density polymer and the low density polymer are in their liquid states.

The low density polymer will solidify when it reaches the relatively cool walls of the mold. The endothermic chemical foaming agent that is added to the mix will decompose at the temperature that exists prior to the instant the high modulus polymer will begin to solidify. The foaming agent is uniformly distributed throughout the melt at that instant. The high internal pressures that are developed by the gases that are emitted when the chemical foaming agent decomposes exerts a high internal pressure against the skin, thereby forcing the skin against the mold surfaces to create a high quality finish on the part. The decomposition of the chemical foaming agent creates a dispersed microcellular structure throughout the finished part. The internal pressure developed by the foaming agent eliminates sink marks on the surface of the part and reduces thermal conductivity of the finished part, as well as relieving internal mechanical stresses.

The improvement in the melt flow that is achieved by the chemical blowing agent makes it possible to reduce cycle time. Because of the cellular structure throughout the interior of the part, the overall weight of the part is reduced to about 70%–80% of the weight of comparable molded parts.

The endothermic chemical nucleating foaming agent that is used in the process may be obtained from Reedy International Corporation of Keyport, N.J. The foaming agent marketed as a powder concentrate known as FP-20 or FP-40, which has a decomposition temperature range of 150° C. to 200° C. That temperature range is sufficiently high so that the low density material in the mix, as well as the color additives, can be transferred to the outer skin region of the part while the melt is being distributed in its liquid state prior to the solidification of the polymers. Solidification is controlled by controlling the temperature of the mold as coolant is circulated through the mold in a manner subsequently to be described. The material with the highest modulus will solidify faster, thereby augmenting the forces that separate the still-liquid, low modulus material. This also helps to center the core material comprising the high modulus portion of the mix and to eliminate core shifting. By controlling the pressure and the temperature in this fashion, the thickness of the skin material can be controlled to about 35% of the entire thickness of the part. The remainder of the part has a cellular structure, as previously indicated, by reason of the foaming agent.

The core material is a so-called ABS material. It comprises an acrylic, which is a hardening agent, that is combined with butadiene rubber and a styrene carrier. The material may comprise an inexpensive regrind material which reduces the cost of the molded part since it reduces the amount of relatively costly polymer material needed near the surface of the part.

Figure 4:
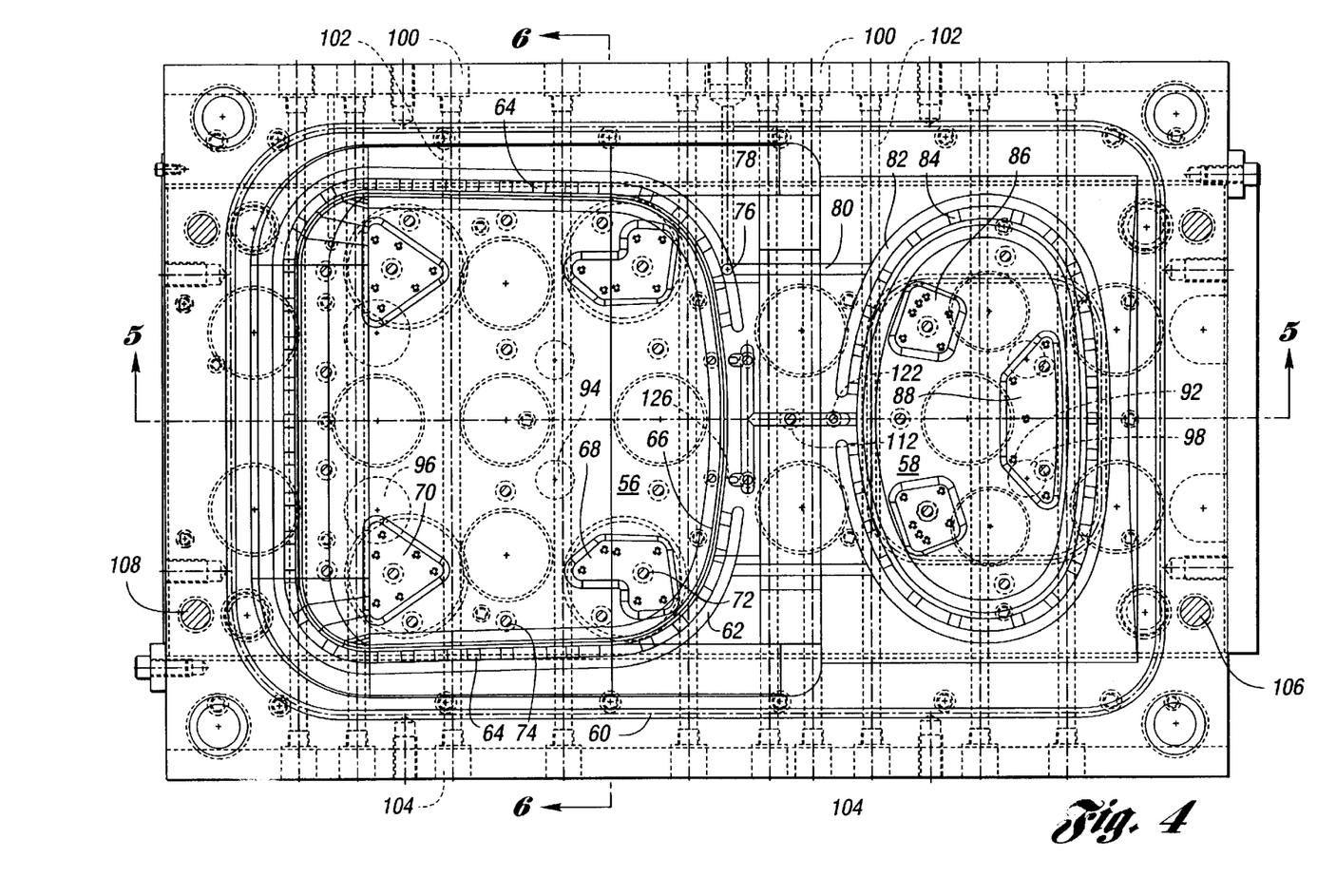
FIG. 4 is a plan view of a family mold for forming a chair seat back and a chair seat.

FIG. 4 shows a two cavity family injection mold. The portion of the mold shown at FIG. 4 is located below a companion mold that will be described with reference to FIG. 5.

The lower mold portion of FIG. 4 has a first cavity 56 which defines a chair seat, and a second separate cavity 58 which defines a chair back support. The mold portion of FIG. 4 has a seal groove 60 which surrounds the entire mold portion located within the area bounded by groove 60. Within the seal groove 60 is an air return passage 62. Vent ports 64, located at multiple locations around the cavity 56, communicate with the air return passage 62. The vent openings 64 communicate with the interior of the cavity 56.

The wall of the cavity 56, which is identified by reference numeral 66, defines the outer perimeter of the molded chair seat.

The mold is formed with recesses that define reinforcing pads 68 and 70. These pads will accommodate a fastener for securing the chair seat to a metal frame. The fastener openings are defined by pins 72. Locator pins 74, formed in the mold, register with openings in the upper mold part which will be described with reference to FIG. 5.

The air return passage 62 communicates with air return port 76, which passes to the exterior of the mold through internal passage 78. The same port 76 communicates with air return passage 80, which connects the air return passage for the cavity 58 with air return passage 62 for the cavity 56.

The air return passage for the cavity 58, shown at 82, surrounds the cavity 58. A plurality of air vents 84 provide communication between multiple regions of the cavity 58 and the air return passage 82.

The back support portion of the chair includes reinforcing pads that are formed by recesses 86 and 88. These permit fasteners to be received through openings defined by pins 90 and 92. A knockout pin can be received in knockout pin openings 94 and 96 for the seat portion of the mold and knockout openings 98 for the back support portion.

A plurality of coolant supply ports 100 provide for the entry of coolant into the coolant passages 102. The coolant outlet ports are shown at 104.

Locator pin openings 106 and 108 are provided for receiving locator pins that are needed to align the upper portion of the mold relative to the lower portion of the mold.

Figure 5:
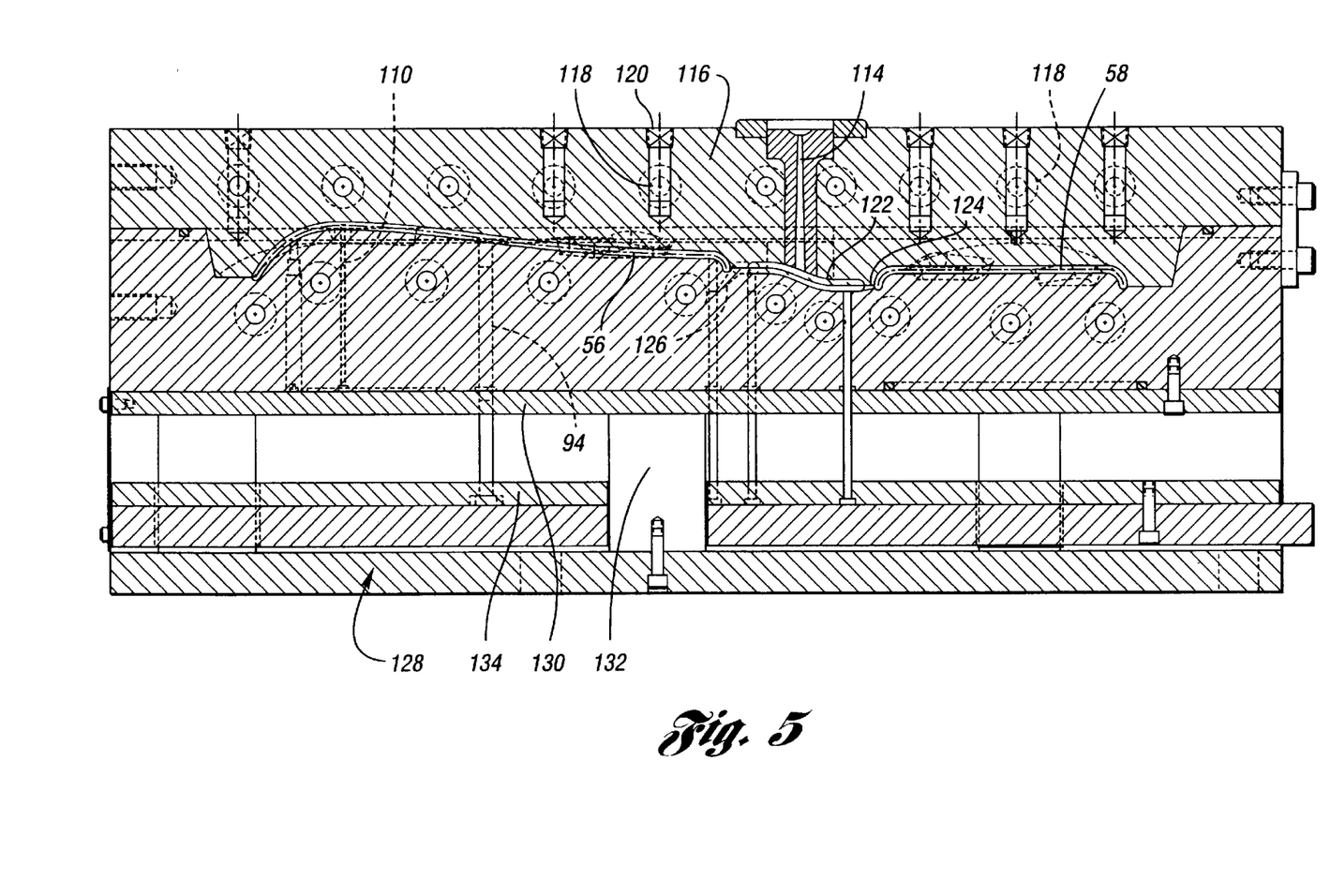
FIG. 5 is a side elevation cross-sectional view of the mold of FIG. 4 taken along the plane of section line 5—5 of FIG. 4.

The openings 72 for the threaded attachment bolts for the seat portion of the chair can be seen in FIG. 5 at 110. Corresponding pins for the back support portion also are provided, although they are not illustrated in FIG. 5. The openings for the attachment bolts for the back support portion, as explained previously, are formed by pins 92, seen in FIG. 4.

The liquid melt that comprises the high density ABS material and the low density polymer is injected into the mold at location 112, seen in FIG. 4. That location communicates with a feed nozzle 114 which is formed in the upper mold portion 116 seen in FIG. 5. The upper mold portion, as in the case of the lower mold portion, is provided with transversely extending coolant passages 118 which communicate with coolant inlet ports 120. These correspond to coolant inlet ports 100, seen in FIG. 4. The coolant in coolant passages 118 exits at coolant outlet ports corresponding to ports 104 of FIG. 4.

The outlet end of the nozzle 114 communicates with melt distributor passage 122 as seen in FIGS. 4 and 5. This passage is formed by registering recesses formed in the lower and upper mold portions.

Distributor passage 122 communicates with each of the two mold cavities. A gate 124 provides communication between distributor passage 122 and mold cavity 58 during the liquid melt filling process. A corresponding gate 126 provides communication between the distributor passage 122 and the mold cavity 56.

As the liquid melt is introduced into the mold cavities through the nozzles 124 and 126, air is displaced from the mold cavities and is transferred through the vent ports 64 and 84 into the air return passages 62 and 82, respectively.

The mold portions are supported on a mold base 128 seen in FIG. 5. The base includes an upper plate 130 and a center support 132. A movable plate 134 carries the knockout pins received in knockout openings 94 and corresponding knockout openings for the seat back portion.

Figure 6:
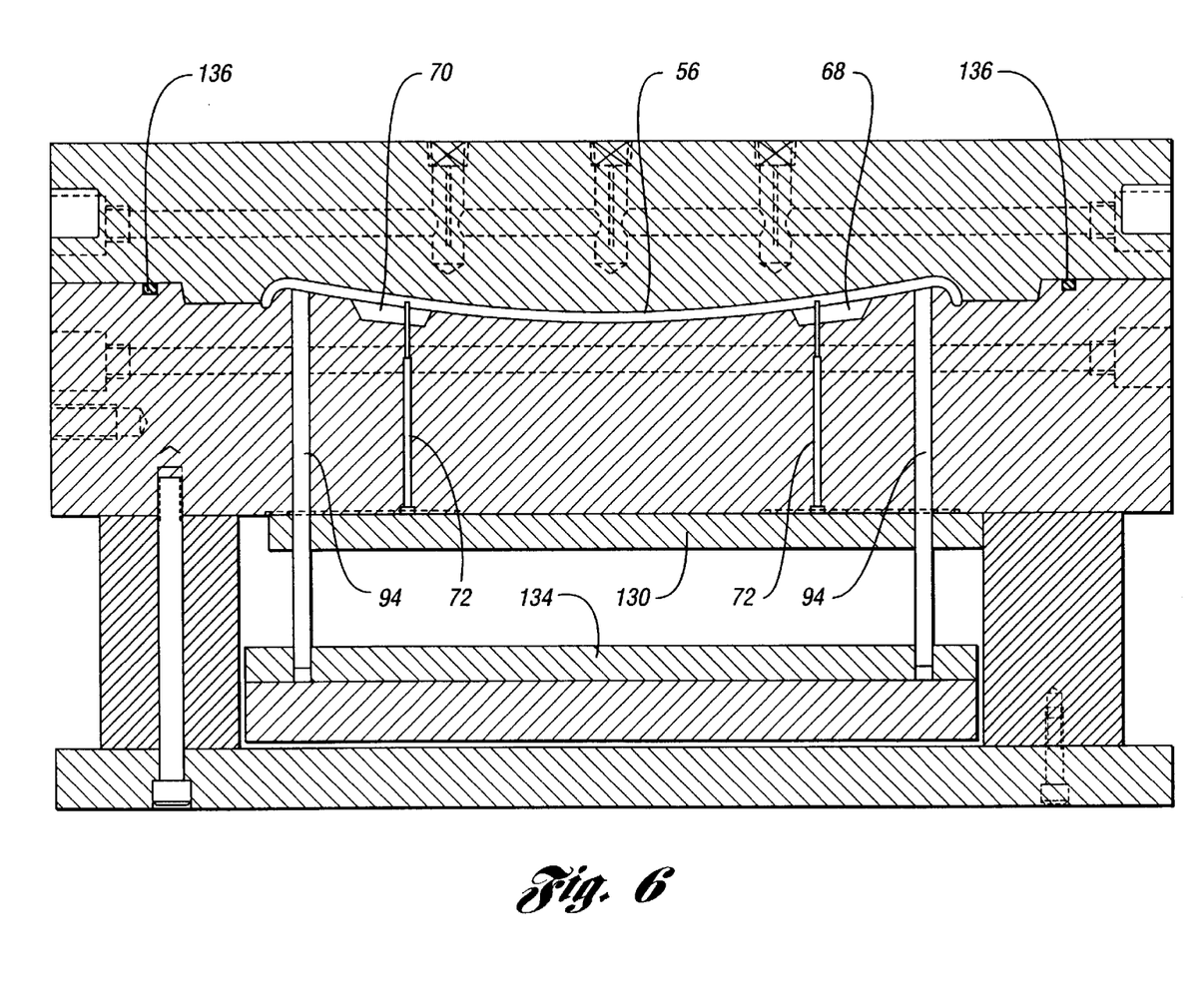
FIG. 6 is an end cross-sectional view of the mold of FIG. 4 as seen from the plane of section line 6—6 of FIG. 5.

The seal that is located in the seal groove 60 is seen at 136 in FIG. 6.

Figures 7, 7B:
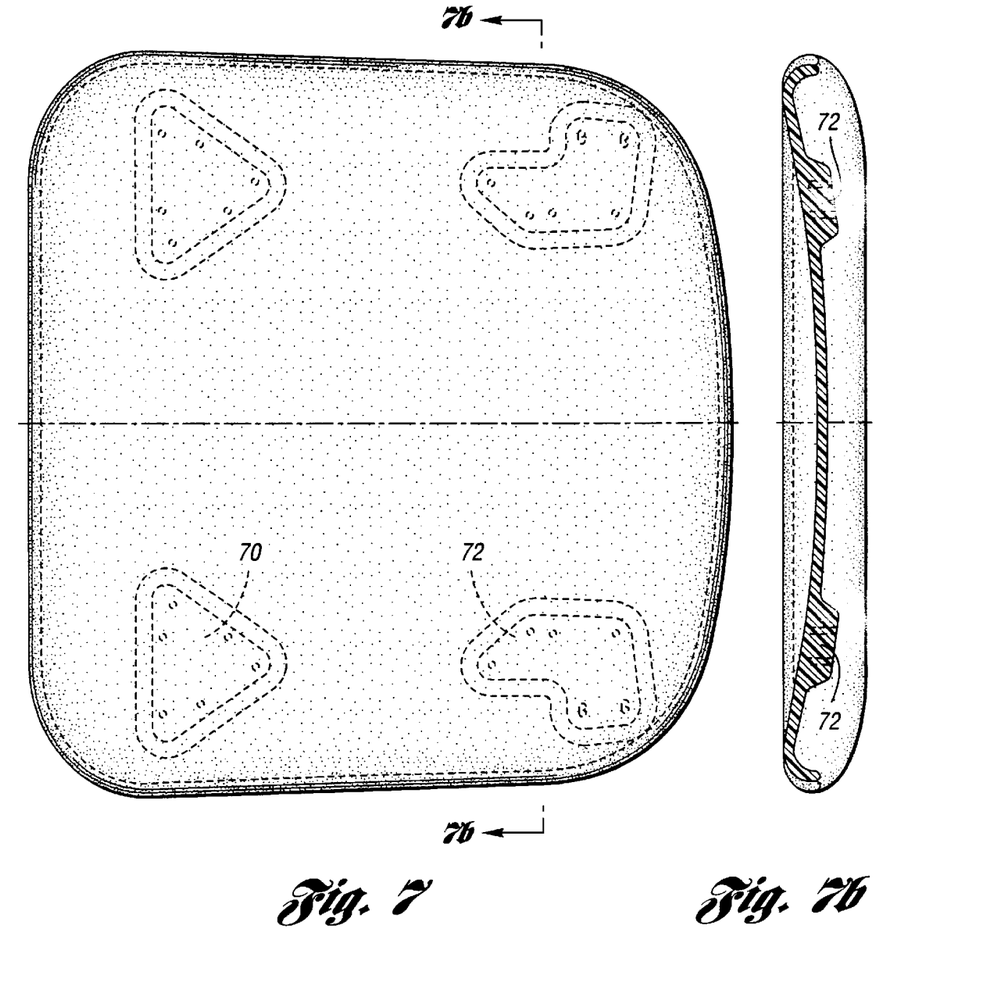
FIG. 7 is a plan view of the seat portion of a part made using the family mold of FIGS. 4–6.
FIG. 7b is a rear view showing the contour of the part.
Figure 7A:
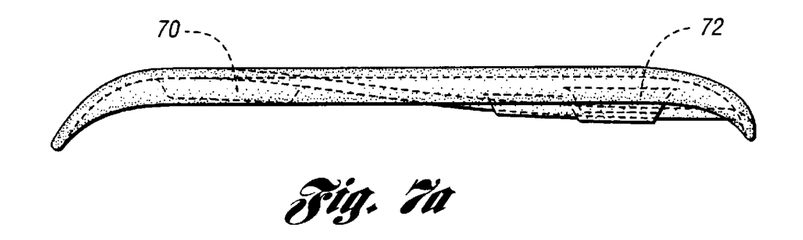
FIG. 7a is a side view of the part shown in FIG. 7.

FIG. 7 is a top view of a finished seat portion of a chair. It includes the structural pads 70 and 72. The rear view of FIG. 7b shows the contour of the seat portion, which conforms to the geometry of the mold cavity 58. The seat contour from the side is seen in the side view of FIG. 7a.

Figure 8:
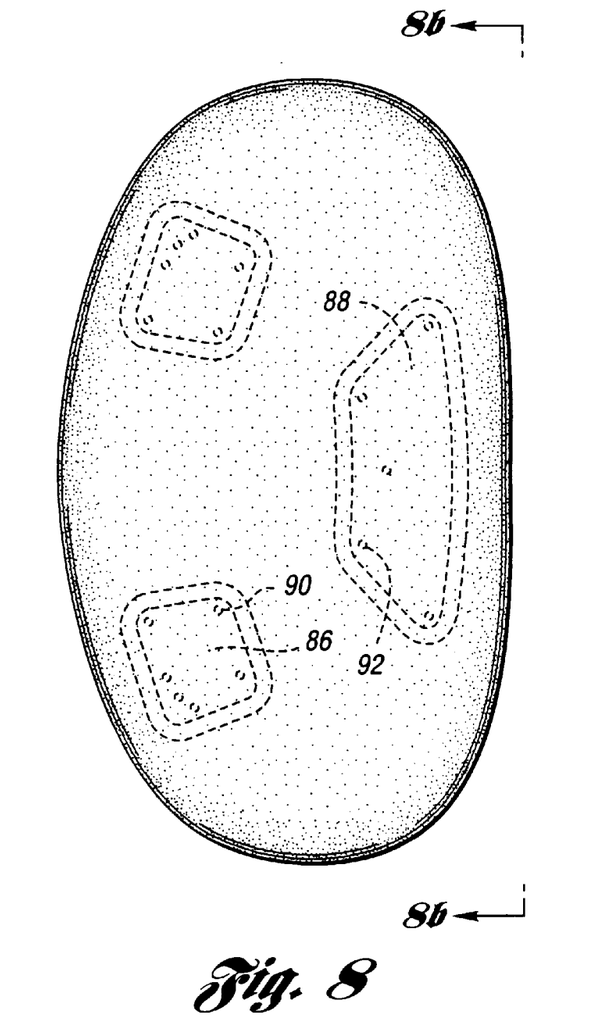
FIG. 8 is a rear view of the seat back that is made with the family mold shown in FIGS. 4–6.
Figure 8A:
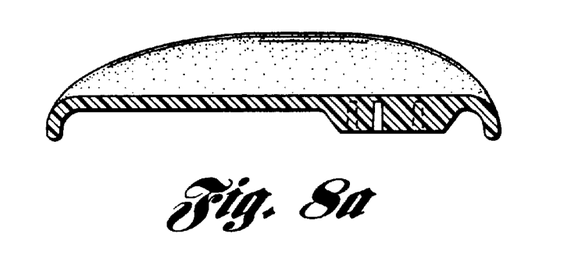
FIG. 8a is an end view of the part shown in FIG. 8.
Figure 8B:
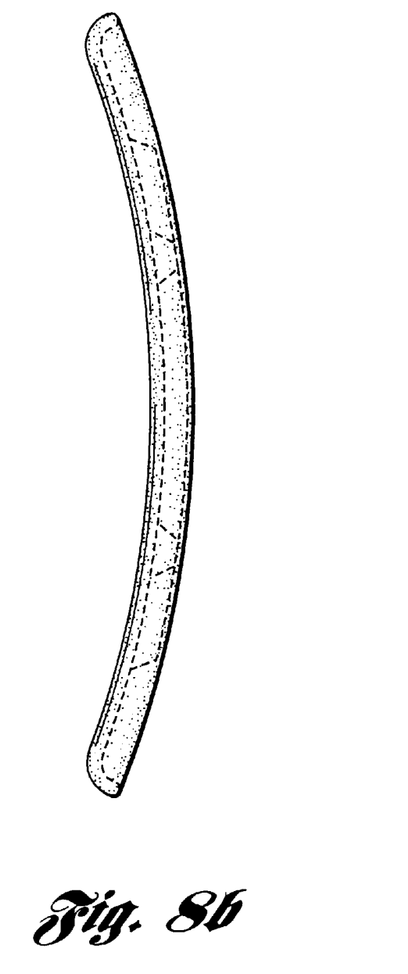
FIG. 8b is a top view of the part shown in FIG. 8.

A front view of the back support is shown in FIG. 8. The contour of the seat back is visible in FIG. 8b and in FIG. 8a.

The gas that is emitted by the chemical foaming agent is carbon dioxide. When the liquid melt is pressurized to the pressures experienced during the molding cycle for the internal melt, the foaming agent provides improved melt flow characteristics and provide increased extrusion rates, thus reducing cycle time and reducing part stress. The decomposition of the blowing agent at process temperatures creates a microcellular structure throughout the part, each cell containing the $CO_2$ created by the foaming agent.

The improved melt flow provided by the foaming agent reduces the number of gates that are required to effect rapid melt distribution throughout the mold cavities.

It will be apparent to persons skilled in the molding art that. modifications to the invention may be made without departing from the scope of the invention. The following claims cover all such modifications as well as equivalents thereof.

What is claimed is:

1. A method for injection molding a chair part in an injection mold having a mold cavity, said mold having an injection nozzle communicating with said cavity, said method comprising:

mixing polymer particles of low density, low flexural modulus polymer with high density particles of high flexural modulus comprising acrylic, butadiene and styrene;

mixing with said polymer particles and said high density particles additives comprising an endothermic foaming agent and a color agent;

delivering said particles and said additives in a mix in a linear path toward said mold;

heating said mix at multiple locations along said path whereby said mix is in the form of a melt at said injection nozzle;

applying air under pressure to said cavity for establishing a counterpressure that controls the distribution of said melt throughout said cavity;

circulating coolant through said mold whereby temperatures at selected locations of said cavity can be controlled;

said Low modulus polymer, upon reaching the walls of said cavity, solidifying to form a skin;

said foaming agent, when its decomposition temperature is reached, forming cells of gas throughout said melt thereby creating an internal pressure in said melt that acts on said skin to create a smooth surface finish for the chair parts; and controlling the temperature of said melt during a cooldown phase of the injection cycle whereby the high modulus material solidifies before the low modulus polymer, the high modulus material thereby being centered in the finished chair part.

2. A method for injection molding chair parts in a multiple-cavity injection mold, said mold having an injection nozzle communicating with each cavity, said method comprising:

mixing polymer particles of low density, low flexural modulus polymer with high density particles of high flexural modulus comprising acrylic, butadiene and styrene;

mixing with said polymer particles and said high density particles additives comprising an endothermic foaming agent and a color agent;

delivering said particles and said additives in a mix in a linear path toward said mold;

heating said mix at multiple locations along said path whereby said mix is in the form of a melt at said injection nozzle;

applying air under pressure to each of said cavities for establishing a counterpressure that controls the distribution of said melt throughout said cavities;

circulating coolant through said mold whereby temperatures at selected locations of said cavities can be controlled;

said low modulus polymer, upon reaching the walls of said cavities, solidifying to form a skin;

said foaming agent, when its decomposition temperature is reached, forming cells of gas throughout said melt thereby creating an internal pressure in said melt that acts on said skin to create a smooth surface finish for the chair parts; and controlling the temperature of said melt during a cooldown phase of the injection cycle whereby the high modulus material solidifies before the low modulus polymer, the high modulus material thereby being centered in the finished chair part.

3. The method as set forth in claim 2 including the steps of measuring the rate of flow of said mix toward said nozzle;

measuring the temperature of said mix during delivery of said mix toward said nozzle;

measuring the temperature of said melt within said cavities at multiple locations along the path of flow of said melt against said air counterpressure;

measuring the pressure of said melt at multiple locations in said cavities; and controlling the rate of filling of said cavities and the localized temperature in said cavities whereby melt is uniformly distributed in said cavities.

4. The method as set forth in claim 3 wherein the step of controlling the rate of filling of said cavities and the localized temperature includes reducing the melt temperature of said polymer to induce solidification thus defining a skin when the polymer reaches the walls of said cavities whereby the thickness of the skin is controlled within predetermined thickness limits, the body of the melt within the skin being characterized by fine, uniformly-distributed cells of gas emitted by said foaming agent.

5. The method as set forth in claim 2 wherein said upper and lower mold portions defined in each of said cavity recesses form reinforcing pads on said chair seat and said back support and mounting surfaces that permit attachment of said chair seat and back support to a chair frame.

* * * * *